United States Patent [19]

Ladouceur

[11] Patent Number: 4,542,569
[45] Date of Patent: Sep. 24, 1985

[54] METHOD OF PREVENTING WHEEL COVER INSERT ROTATION

[75] Inventor: Lawrence C. Ladouceur, Windsor, Canada

[73] Assignee: Rockwell International Corporation, Pittsburgh, Pa.

[21] Appl. No.: 469,885

[22] Filed: Feb. 25, 1983

[51] Int. Cl.⁴ ............................................. B21D 53/32
[52] U.S. Cl. ................................ 29/159 A; 301/37 R; 301/37 P
[58] Field of Search ................... 29/159 A; 301/37 C, 301/37 CD, 37 B, 37 AT, 37 PB, 37 P, 37 SS, 37 R

[56] References Cited

U.S. PATENT DOCUMENTS

| | | | |
|---|---|---|---|
| 3,095,241 | 6/1963 | Fitzgerald | 301/37 R |
| 4,094,550 | 6/1978 | Toal et al. | 29/159 A |
| 4,220,373 | 9/1980 | Spisak | 301/37 P |
| 4,383,716 | 5/1983 | Osborn | 301/37 P |

Primary Examiner—Howard N. Goldberg
Assistant Examiner—P. W. Echols

[57] ABSTRACT

A method of preventing insert rotation in an ornamental wheel cover that employs a plastic insert for lightweight reinforcement and decorative ornamentation of the wheel cover. An outer ornamental member, a lightweight insert, and a retaining ring are all formed with complementary annular radially extending flanges at their outer periphery. Prior to assembly, the annular flange of the retaining ring is spiked so as to form sharp edged barbs on its outboard surface. The components are then assembled by sandwiching the insert between the outer member and retaining ring and placed in a die curling and stamping apparatus. The outermost flange of the outer ornamental member is die curled to join the member with the retaining ring. Pressure is then applied to the retaining ring in the vicinity of the barbs to embed the barbs in the insert so as to prevent the insert from rotating relative to the retaining ring.

8 Claims, 6 Drawing Figures

METHOD OF PREVENTING WHEEL COVER INSERT ROTATION

BACKGROUND OF THE INVENTION

1. Field of Invention

This invention relates to ornamental wheel covers and in particular, wheel covers that employ a plastic insert for lightweight reinforcement and decorative ornamentation of the wheel cover.

2. Description of the Prior Art

Use of ornamental wheel covers is widely known in the art. To effectuate cost savings and weight reduction in the wheel cover ornamentation, lightweight plastic inserts can be used in the wheel cover assembly. In one type of wheel cover, the insert is fitted between a decorative, outer sheet metal member and a sheet metal retaining ring. The insert provides lightweight reinforcement of the wheel cover and in some cases, decorative outer ornamentation. The retaining ring includes a plurality of deflectable retaining fingers that rigidly engage the inner surface of the wheel rim upon installation of the wheel cover.

An attractive arrangement in assembling this type of wheel ornamentation is shown in U.S. Pat. Nos. 4,220,373 and 4,295,685. The outer edge of the outer metal ornamental member is generally folded around the outer edge of the insert and the inboard surface of the retaining ring flange to hold the assembly together. There is a limitation as to how much pressure can be applied to the outer edges of the wheel cover assembly. If too much pressure is applied, the outer perimeter of the plastic insert could be crushed and damaged. Thus, tolerances during assembly become critical. In these two patents, the retainer flange that is captured by the outer flange of the outer ornamental member is flat and directly abuts the outer peripheral flange of the insert. Thus, the movement of the forming dies and the amount of pressure applied to fold the outer flange around the insert and the retainer must be critically monitored. Too much pressure may cause the outer edge of the insert to be crushed while too little pressure, which could result from wear in the forming dies or tolerance variations, will not effectively prevent relative rotation of the elements as is essential for proper assembly. Even though it has been found that the metal on metal contact at the outer edges of the wheel cover between the outer ornamental member and the retaining ring tends to prevent their relative rotation, it is not uncommon for the forces in the wheel cover, due to acceleration and deceleration of the wheel, to cause relative slipping of the plastic insert. Several methods have been developed to prevent this.

In U.S. Pat. No. 4,220,373, an axially extending stop portion is integrally formed on the plastic insert to be received in a single notch that is formed on the retaining ring. Thus, not only is there additional fabrication steps required for both the plastic insert and the retaining ring, the insert and the retaining ring must be accurately aligned during assembly to effectuate the interference connection between the stop and the notch.

In U.S. Pat. No. 4,295,685 the plastic insert is preferably coupled to the outer ornamental member, rather than the retaining ring, by a set of screws that pass through the plastic insert and are threadably engaged in an outer hub cap, thus directly fastening the outer member to the plastic insert. Again, this requires additional fabrication of the plastic insert and additional alignment considerations during the wheel cover assembly. It should be noted that in one embodiment, the retaining ring is held in position by bending a flange on the outer member around the retaining ring. As mentioned, such a configuration would require critical monitoring during assembly and most likely some axially extending portions on the outer surface of the plastic insert that match the inside surface of the metal ornamental cover to prevent relative rotation of the elements.

Although the above patents illustrate the generally preferred methods of assembly, other patents disclose methods of directly connecting the plastic insert to the retaining means.

U.S. Pat. Nos. 3,252,738 and 4,007,967 use integral locking pins in the plastic insert fitted through holes in the retaining ring. The pins are fitted or riveted to prevent relative separation movement.

In U.S. Pat. Nos. 3,416,840, 3,601,449, 3,876,257 and 4,328,997, the retaining means has gripping fingers that engage an axially inwardly extending annular flange at the outer perimeter of the plastic insert to prevent rotation of the retaining means relative to the plastic insert.

As can be seen, all the cited wheel covers require specially formed and complicated inserts or retaining rings or both. In addition, the fabrication tolerances are critical. In arrangements that require the retaining ring to be inserted into or over a flange on the insert or require the retaining ring to be mated with integral plastic pins or stops, variation in component diameters or stop locations due to low tolerances, wear in the forming dies, or expansion and contraction of the work pieces, can result in an inability to assemble the wheel cover. Also, additional steps in the fabrication and assembly of the wheel cover may be required. For example, the fabrication of a retaining ring will require an extra operation if holes must be cut in the retaining ring for the integral plastic pins of the plastic insert to fit therethrough.

Although there are several methods of assembling a wheel cover, it is always advantageous to find a new method that can produce the same results in simple and more cost effective manner.

SUMMARY OF THE INVENTION

It is an object of this invention to provide a method of assembling a lightweight wheel cover.

It is a further object of this invention to provide a method of assembling a lightweight wheel cover with a plastic insert.

It is yet an additional object of this invention to provide a method of assembling a lightweight wheel cover in which the plastic insert is sandwiched between an outer ornamental member and retaining ring and will not rotate relative to either when the wheel cover is subjected to rotation forces resulting from acceleration or deceleration of a motor vehicle.

It is yet a further object of this invention to provide a simple and economical method of preventing the plastic insert in a plastic wheel cover from rotating relative to the outer ornamental member and the retaining ring of the wheel cover.

These and other objects of this invention are disclosed in the preferred embodiment of the invention which provides a wheel cover assembly having a lightweight plastic reinforcing insert sandwiched between an outer ornamental member and inner annular retaining ring. The outer ornamental member has a decorative design on its outer face and is formed in a configuration at its peripheral area that generally complements the outer periphery of the lightweight plastic insert. The extreme outer edge of the outer ornamental member is provided with a generally axially inwardly extending cylindrical flange. The lightweight plastic insert is generally dish shaped with a generally annular flange extending outward from an axially outward radially extending flange at the outer periphery of the insert. The retaining ring provides for generally axially extending flanges separated by a generally radially outwardly extending shoulder flange. The inner periphery of the retaining ring provides a retaining structure of circumferentially spaced, radially resilient, deflectable retaining fingers. The outer periphery of the retaining ring provides an annular radially outwardly extending flange joined to an annular radially inwardly extending flange. Before assembly, the annular radially outwardly extending flange of the retaining ring is spiked to form sharp edged barbs in the outboard surface of the flange. During assembly, the plastic insert is captured between the retaining ring and the outer ornamental member. The flange at the outer edge of the outer ornamental member is die curled to contact the retaining ring at the inwardly extending annular flange and to capture the plastic insert therebetween. The metal on metal contact will prevent the outer ornamental member from rotating relative to the retaining ring. During this operation, pressure is applied to the retaining ring in the vicinity of the sharp edged barbs so that the barbs penetrate the inboard surface of the plastic insert and embed in the insert thus preventing the insert from rotating relative to the retaining ring.

These and other objects of the invention will become apparent from the following description and drawings.

DESCRIPTION OF THE PREFERRED EMBODIMENT

Figure 1:
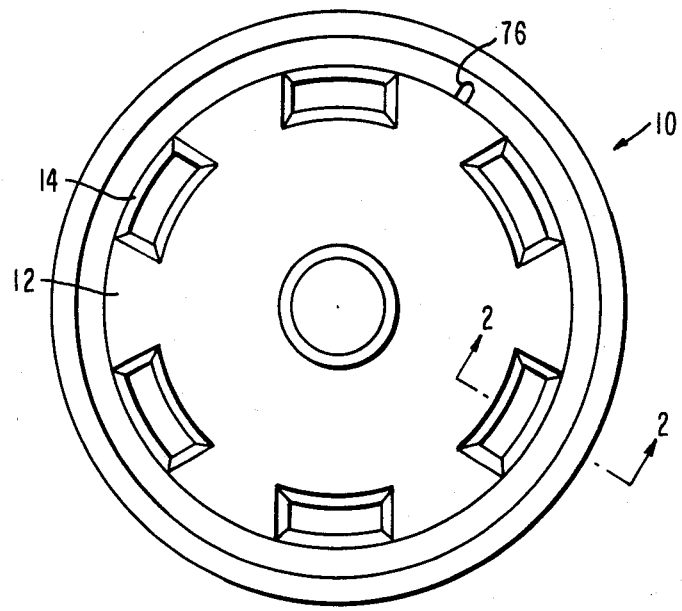
FIG. 1 is a front elevation of the wheel cover in accordance with the present invention as it appears when mounted on a wheel.
Figure 2:
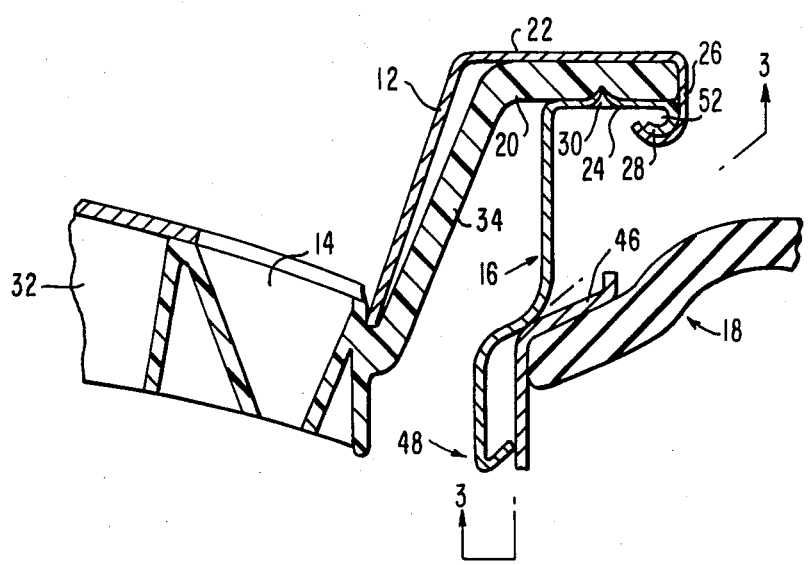
FIG. 2 is a sectional view of the preferred embodiment of the present invention taken along line 2—2 of FIG. 1.
Figure 3:
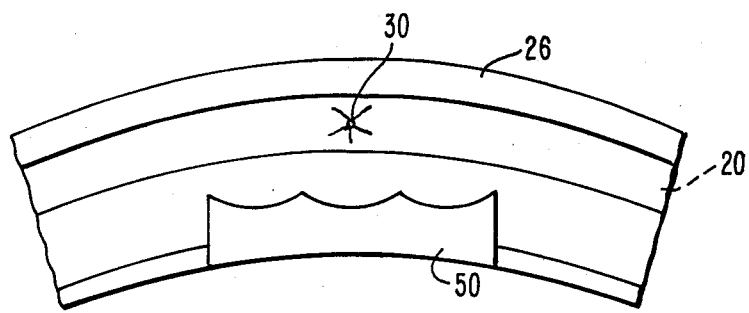
FIG. 3 is a sectional view of the wheel cover taken through line 3—3 of FIG. 2.

As seen in FIGS. 1, 2 and 3, the preferred wheel cover 10 includes an outer ornamental member 12, lightweight reinforcing insert 14 and a retaining means 16. The wheel cover 10 is mounted on vehicle wheel 18. A generally annular radially extending flange 20 at the periphery of insert 14 is sandwiched between a second generally annular radially extending flange 22 on outer ornamental member 12 and a third generally annular radially extending flange 24 on retaining means 16. A generally axially inwardly extending cylindrical flange 26 at the outer periphery of outer ornamental member 12 is curled around flange 20 of insert 14 and a generally radially inwardly extending flange 28 on retaining means 16. Retaining means flange 24 is provided with a plurality of axially outwardly extending jagged edged barbs 30 that are embedded in insert flange 20 during assembly. The frictional interference between outer member flange 26 and radially extending flange 28 will prevent relative rotation between outer ornamental member 12 and retaining means 16, while embedded jagged edged barbs 30 will prevent relative rotation between retaining means 16 and lightweight reinforcing insert 14. Details of the preferred wheel cover 10 components and assembly are discussed hereinafter.

The outer ornamental member 12 is generally formed out of sheet metal with a variety of decorative designs on its outer surface to add to the aesthetic qualities of wheel cover 10. In the preferred embodiment, outer ornamental member 12 covers most of the lightweight insert 14. As an alternative, an outer ornamental member can be limited to cover only the outer peripheral region of wheel cover 10 so that the exposed central region 32 of the insert 14 will provide the decorative design. In such a case, the outer ornamental member 12 can be stamped from a flat annular plate or roll formed from a flat metal strip that is welded at its ends to form a ring. The peripheral area of outer ornamental member 12 has a generally annular radially extending flange 22 that generally complements flange 20 of lightweight insert 14. The extreme outer periphery of outer ornamental member 12 has a generally axially inwardly extending cylindrical flange 26, as seen in its unassembled form in FIG. 5.

The lightweight insert 14 is generally formed of resilient, high impact plastic or similar material and is provided with a rigid structure to reinforce the wheel cover 10 structure. The central area of the insert 14 is generally dish shaped. The outer periphery of insert 14 has a generally annular radially extending flange 20 extending outward from a generally axially outwardly radially extending flange 34. Flange 20 has an inboard surface 37 and an outboard surface 38.

Figure 4:
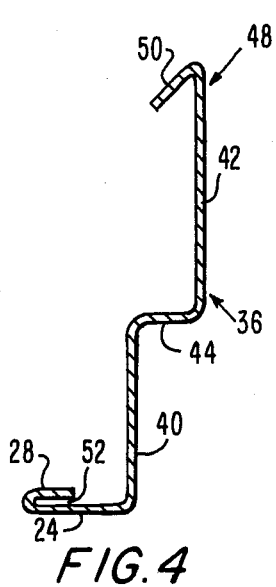
FIG. 4 is a cross-section of the retaining ring immediately after roll forming.

In the preferred embodiment, the retaining means 16 is a retaining ring 36 generally formed by stamping or roll forming a strip of sheet metal and welding the ends together to form a ring. FIG. 4 shows the preferred cross-section of retaining ring 36 after the forming operation. The retaining ring 36 provides for generally axially extending flanges 40 and 42 separated by a generally radially outwardly extending shoulder flange 44. Shoulder flange 44 abuts wheel rim 46 when wheel cover 10 is fully installed on wheel 18. Retaining ring 36 also provides an integral retaining structure indicated generally at 48. Retaining structure 48 is comprised of circumferentially spaced, radially resilient, deflectable retaining fingers 50 that are generally known in the art. Fingers 50 will engage and retainingly secure the wheel cover 10 to the wheel rim 46.

Retaining ring 36 is also provided with an annular radially extending flange 24 joined to an inwardly extending annular surface 28 forming channel 52 therebetween.

Figure 5:
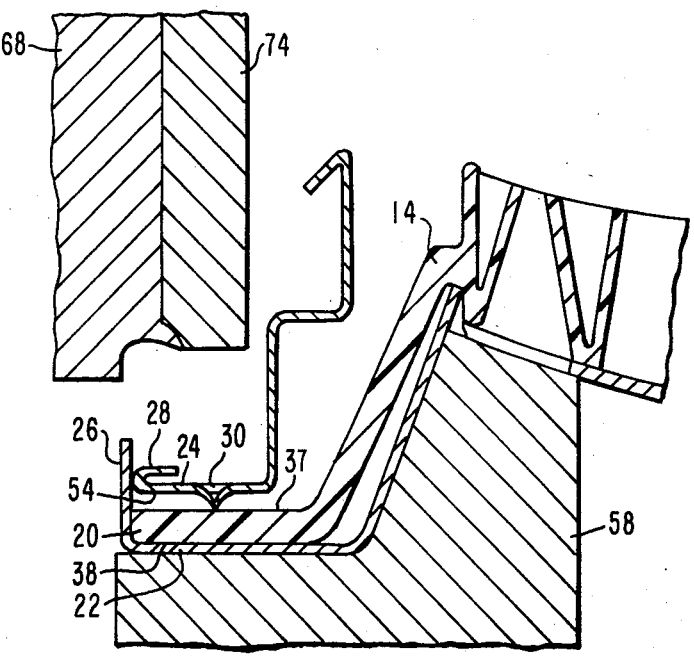
FIG. 5 is a cross-section of the assembled wheel cover in the assembly apparatus, prior to the die curling and seating operation.

After retaining ring 36 is formed but prior to wheel cover 10 assembly, a plurality of axially outwardly extending sharp edged barbs 30 are formed in the outboard surface 54 of flange 24 as shown in FIG. 5. These barbs are easily formed by spiking the retaining ring 36 with a nail punch or some other means that will penetrate through flange 24.

Figure 6:
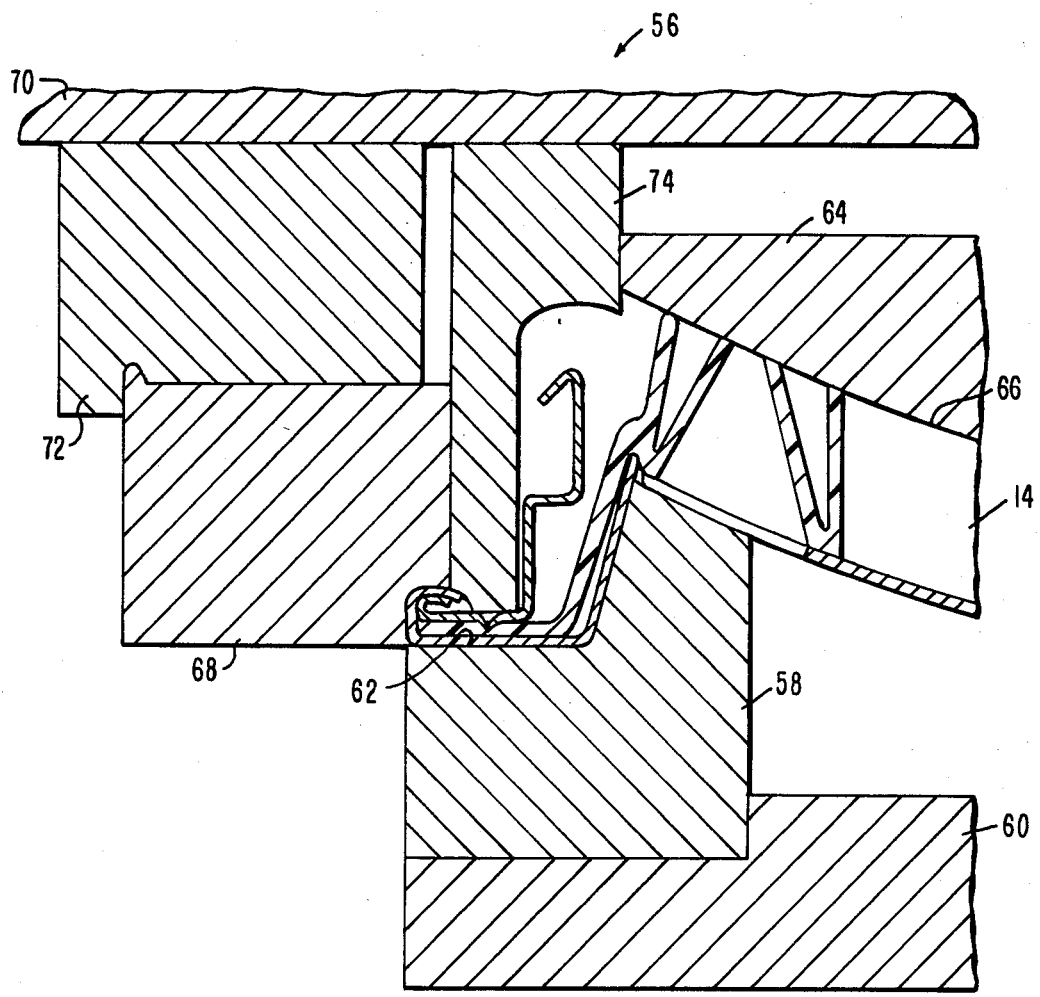
FIG. 6 is a cross-section of the wheel cover die curling and seating apparatus.

During the assembly of wheel cover 10, the outer periphery of plastic insert 14 is sandwiched between retaining ring 36 and outer ornamental member 12 as shown in FIG. 5. Flange 26 of outer ornamental member 12 will align the components of wheel cover 10 prior to the final assembly operation. The wheel cover 10 assembly is placed in a die curling and seating apparatus, generally indicated at 56. The outer periphery of wheel cover 10 assembly is positioned on an annular riser 58, which is supported by a disc-shaped riser 60. Surface 62 of annular riser 58 generally complements the outer periphery of the wheel cover assembly. Pad 64 is positioned on the inboard surface 66 of insert 14, to help seat the wheel cover 10 assembly on riser 58. Curl ring 68 moves from an open position as shown in FIG. 5 to a closed position as shown in FIG. 6, to die curl cylindrical flange 26 and to fixedly join outer ornamental member 12 and retaining ring 36 so as to prevent their relative rotation and to capture plastic insert 14 therebetween. Pressure is applied to curl ring 68 by upper die shoe 70 through annular riser 72. During the die curling operation, pressure is applied by upper die shoe 70, through seating ring 74, to flange 24 of retaining ring 36 in the general vicinity of barbs 30 so that barbs 30 penetrate and embed in the inboard surface 37 of flange 20 of plastic insert 14 thus preventing insert 14 from rotating relative to retaining ring 36.

To better understand the preferred embodiment of wheel cover 10, it is necessary to discuss certain additional features.

Due to the configuration of the wheel cover's components and their method of assembly, the component alignment problem found in other plastic and metal wheel cover assemblies is significantly reduced since there are no plastic pins or slots in an insert that must be accurately aligned with openings or tabs in a retaining ring. The only required alignment may be to align the wheel cover components for the tire valve stem (not shown). If such is the case, the valve stem opening 76 must be aligned as shown in FIG. 1 at the single location prior to the die curling and seating operations.

The preferred wheel cover 10 design does not require high tolerances during fabrication. Since there are no integral plastic posts in insert 14 that must be aligned with openings in the retaining ring 36, the outer diameter of retaining ring 36 can vary so long as retaining ring 36 fits within cylindrical flange 26 of outer ornamental member 12. In addition, the location of barbs 30 can also vary on flange 24 since there is no predetermined position at which barbs 30 must engage plastic insert 14. As with the retaining ring 36, the outer diameter of insert 14 can also vary so long as it can fit within flange 26 of outer ornamental member 12, since there are no pins or notches with which it must be aligned.

Although it is recognized that retaining ring 36 does not have to have flange 28 in order for wheel cover 10 to be functional, in the preferred embodiment, curl ring 68 curls cylindrical flange 26 so that it is in intimate contact with retaining ring flange 28. Flange 28 can deflect into channel 52 without contacting flange 24, thus reducing the possibility of crushing flange 20 of insert 14. Slight variations in the distance curl ring 68 moves will not effect the overall effectiveness of assembled wheel cover 10. In addition, the resiliency of flange 28 will cause it to move in an axially inward direction after the die curling operation has forced it in an axially outward direction into channel 52. As a result, there will be great frictional forces at the interface between flanges 26 and 28.

While the preferred embodiment of the invention has been illustrated and described herein, the variations will become apparent to one of ordinary skill in the art. Accordingly, the invention is not to be limited to the specific embodiment illustrated and described herein, and the true scope and spirit of the invention are to be determined by reference to the amended claims.

The embodiments of the invention in which an exclusive property or privilege is claimed are defined as follows.

I claim:

1. Method of assembling a wheel cover of the type including an outer ornamental member, a reinforcing insert and a retainer, comprising the steps of:

forming said insert with a first annular radially extending flange at the periphery of said insert;

forming said outer ornamental member with an axially inwardly extending cylindrical flange at the periphery joined to a second annular radially extending flange that complements said first annular radially extending flange of said insert;

forming said retainer with a third annular radially extending flange that generally complements said first annular radially extending flange;

forming a plurality of axially outwardly extending jagged edged barbs on the outboard side of said third annular radially extending flange;

placing said insert between said retainer and said outer ornamental member so that said barbs of said retainer contact the inboard surface of said first annular radially extending flange and said second annular radially extending flange contacts the outboard surface of said first flange;

bending said cylindrical flange of said outer ornamental member radially inwardly to fixedly join said outer ornamental member to said retainer and to capture said insert therebetween; and applying pressure to the inboard surface of said third annular radially extending flange in the vicinity of said barbs so that said barbs will penetrate said insert and prevent rotation of said insert relative to said retainer.

2. A method as described in claim 1, wherein said reinforcing insert is formed from lightweight, resilient plastic.

3. A method as described in claim 1, wherein said jagged edged barbs are formed by fully penetrating said third annular radially extending flange.

4. A method as described in claim 3, wherein said third annular radially extending flange is penetrated by a nail punch to form said jagged edged barbs.

5. A method as described in claim 1, wherein the bending of said cylindrical flange of the outer ornamental member is done by die curling said cylindrical flange.

6. A method as described in claim 5, wherein the steps of bending the cylindrical flange of said outer ornamental member and applying pressure to the inboard surface of the third annular radially extending flange in the vicinity of the jagged barbs are done simultaneously.

7. A method as described in claim 6, wherein said bending and pressing steps are done by a single die.

8. Method of assembling a wheel cover of the type including an outer ornamental member reinforcing insert and a retainer, comprising the steps of:

(a) forming said insert with a first annular radially extending flange at the periphery of said insert;

(b) forming said outer ornamental member with an axially inwardly extending cylindrical flange at the periphery joined to a second annular radially extending flange that complements said first annular radially extending flange of said insert;

(c) forming said retainer with a radially extending retainer surface, an axially extending flange and a third annular radially extending flange that generally complements said first annular radially extending flange and that is spaced from the radially extending retainer surface, thereby forming a channel between the third annular radially extending flange and the radially extending retainer surface;

(d) forming a plurality of axially outwardly extending jagged edged barbs on the outboard side of said third annular radially extending flange;

(e) placing said insert between said retainer and said outer ornamental member so that said barbs of said retainer contact the inboard surface of said first annular radially extending flange and said second annular radially extending flange contacts the outboard surface of said first flange;

(f) bending said cylindrical flange of said outer ornamental member radially inwardly to fixedly join said outer ornamental member to said retainer and to capture said insert therebetween the third annular radially extending flange of the retainer and the second radially extending flange of the ornamental member; and (g) applying pressure to the inboard surface of said third annular radially extending flange in the vicinity of said barbs so that said barbs will penetrate said insert and prevent rotation of said insert relative to said retainer whereby the barbs penetrate the first annular radially extending flange and whereby the bending of the cylindrical flange inward forces the inwardly extending cylindrical flange in an axially outward direction into the channel toward the second annular radially extending flange whereby the inwardly extending cylindrical flange resiliently presses on the inwardly bent cylindrical flange of the ornamental member increasing frictional forces between the cylindrical flange of the ornamental member and the inwardly extending cylindrical flange of the retainer, while reacting against the reinforcing insert and holding the barbs penetrating into the insert.

* * * * *